US011663869B2

(12) United States Patent
Shin

(10) Patent No.: US 11,663,869 B2
(45) Date of Patent: *May 30, 2023

(54) ACCESS CONTROL SYSTEM AND ACCESS CONTROL METHOD USING THE SAME

(71) Applicant: SUPREMA HQ INC., Seongnam-si (KR)

(72) Inventor: Dong Mok Shin, Seongnam-si (KR)

(73) Assignee: SUPREMA HQ INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,848

(22) Filed: Jan. 14, 2022

(65) Prior Publication Data
US 2022/0139141 A1 May 5, 2022

Related U.S. Application Data

(63) Continuation of application No. 17/125,760, filed on Dec. 17, 2020, now Pat. No. 11,232,665, which is a
(Continued)

(30) Foreign Application Priority Data

Aug. 8, 2018 (KR) ........................ 10-2018-0092591

(51) Int. Cl.
G07C 9/28 (2020.01)
G06F 21/44 (2013.01)
G07C 9/00 (2020.01)
(52) U.S. Cl.
CPC ............... *G07C 9/28* (2020.01); *G06F 21/44* (2013.01); *G07C 2009/00769* (2013.01)
(58) Field of Classification Search
None
See application file for complete search history.

(56) References Cited

U.S. PATENT DOCUMENTS 3,826,415 A 7/1974 Koss
7,446,644 B2 11/2008 Schaffzin
(Continued)

FOREIGN PATENT DOCUMENTS

JP 2006304141 A 11/2006
JP 2008-014001 A 1/2008
(Continued)

OTHER PUBLICATIONS

International Search Report in Application No. PCT/KR2019/009937 dated Nov. 29, 2019.
(Continued)

*Primary Examiner* — K. Wong
(74) *Attorney, Agent, or Firm* — Maschoff Brennan

(57) ABSTRACT

An access control method of a door operating device that communicates with a user terminal, the access control method may comprise determining a distance between the door operating device and the user terminal based on a received signal strength corresponding to a transmitted signal from at least one of the door operating device and the user terminal; determining whether the distance between the door operating device and the user terminal is within a first distance; establishing a communication connection between the door operating device and the user terminal when the distance between the door operating device and the user terminal is within the first distance; determining whether the distance between the door operating device and the user terminal is within a second distance; and obtaining open authentication information when the distance between the door operating device and the user terminal is within the second distance.

20 Claims, 9 Drawing Sheets

Related U.S. Application Data continuation of application No. 16/355,389, filed on Mar. 15, 2019, now Pat. No. 10,878,649.

(56) References Cited

U.S. PATENT DOCUMENTS

| | | | |
|---|---|---|---|
| 9,443,365 B2 | 9/2016 | Ahearn | |
| 9,704,317 B2 | 7/2017 | Baumgarte | |
| 9,805,533 B2 | 10/2017 | Shin | |
| 9,805,534 B2 | 10/2017 | Ho | |
| 10,878,649 B2 | 12/2020 | Shin | |
| 11,232,665 B2 * | 1/2022 | Shin | H04W 4/023 |
| 2013/0176107 A1 | 7/2013 | Dumas et al. | |
| 2014/0049361 A1 | 2/2014 | Ahearn et al. | |
| 2017/0076520 A1 | 3/2017 | Ho et al. | |

FOREIGN PATENT DOCUMENTS

| | | |
|---|---|---|
| JP | 2015183455 A | 10/2015 |
| JP | 2016223277 A | 12/2016 |
| JP | 2017014736 A | 1/2017 |
| JP | 2018090991 A | 6/2018 |
| KR | 10-2016-0070413 A | 6/2016 |
| KR | 10-2016-0132168 A | 11/2016 |
| KR | 10-1873929 B1 | 7/2018 |

OTHER PUBLICATIONS

Korean Office Action issued in corresponding application No. 10-2018-0092591, dated Jan. 22, 2021.

European Search Report issued in corresponding application No. 19847638.4, dated Mar. 24, 2022.

Japanese Office Action issued in corresponding application No. 2021-507085, dated Jan. 4, 2022.

Japanese Decision to Grant in corresponding application No. 2021-507085, dated Oct. 18, 2022.

* cited by examiner

ACCESS CONTROL SYSTEM AND ACCESS CONTROL METHOD USING THE SAME

CROSS-REFERENCE TO RELATED APPLICATION

This application claims priority to and the benefit of Korean Patent Application No. 10-2018-0092591, filed on Aug. 8, 2018, the disclosure of which is incorporated herein by reference in its entirety.

BACKGROUND

1. Field of the Invention

The present invention relates to an access control system and an access control method using the same.

2. Discussion of Related Art

In controlling access to a building or a specific area, a technique enabling an access control device to obtain information pre-stored in a user terminal to determine whether to open the door to control access is used.

User terminals employing this technique have been conventionally implemented as card keys or the like, but recently application has been gradually extended to mobile terminals such as a smartphone carried by a user.

In performing access control using a mobile terminal, it takes much time for the access control device to obtain, from the mobile terminal, information that is necessary to determine whether to open the door by establishing a communication connection and acquiring data, as compared to a conventional case where a card key is used. As a result, inconvenience is caused to the user as to make the user feel that the operation is slow.

SUMMARY OF THE INVENTION

The present invention is directed to an access control system capable of addressing inconvenience caused to a user due to a time required to open a door when a request is made by the user, by establishing a communication connection at a predetermined distance and obtaining information necessary to open the door at a closer distance, and an access control method using the same.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
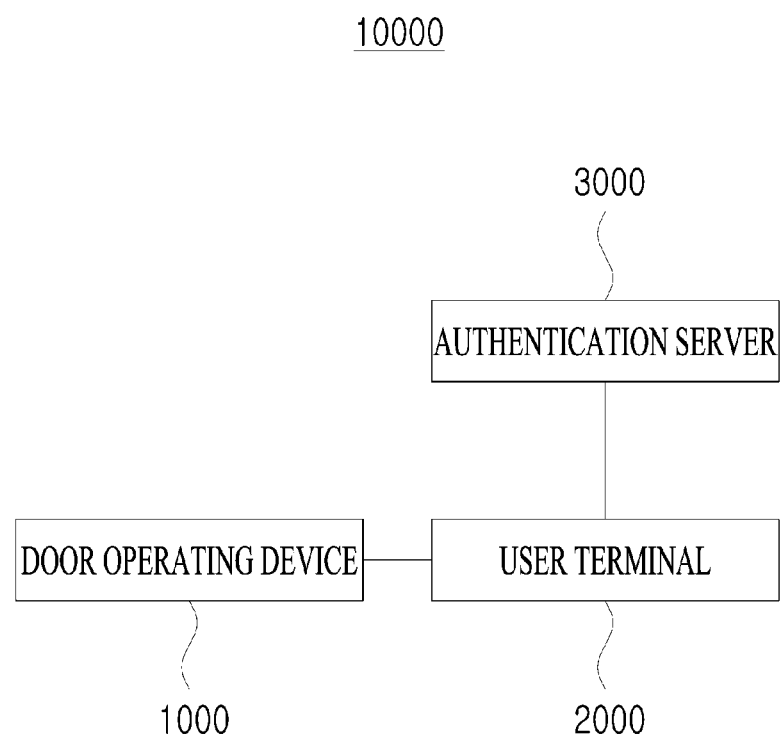
FIG. 1 is an environment diagram illustrating an access control system according to an exemplary embodiment.

The foregoing objects, features and advantages of the present invention will become more apparent from the following detailed description taken in conjunction with the accompanying drawings. Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

It will be appreciated that for simplicity and clarity of illustration, layers and regions have not necessarily been drawn to scale in the drawings. It will be understood that when an element or a layer is referred to as being "on" or "over" another element or layer, it can be directly on the other element or layer or intervening layers or elements can be present. Like reference numerals designate like elements throughout the specification. It is also to be understood that like reference numerals designate like elements of like function within the same technical sprit shown in the drawings of the embodiments.

Detailed description of well-known functions and configurations incorporated herein will be omitted when it may make the subject matter of the present invention rather unclear. Further, numerals (e.g., first, second, etc.) used in the description of the present invention are merely identifiers for distinguishing one element from another.

As used herein, the suffixes "module" and "unit" are added or used interchangeably to facilitate preparation of this specification and are not intended to suggest distinct meanings or functions.

According to an aspect of the present disclosure, there is provided an access control method of a door operating device that communicates with a user terminal, the access control method may comprise determining a distance between the door operating device and the user terminal based on a received signal strength corresponding to a transmitted signal from at least one of the door operating device and the user terminal; determining whether the distance between the door operating device and the user terminal is within a first distance; establishing a communication connection between the door operating device and the user terminal when the distance between the door operating device and the user terminal is within the first distance; determining whether the distance between the door operating device and the user terminal is within a second distance; obtaining open authentication information when the distance between the door operating device and the user terminal is within the second distance; and determining whether the door is open or not based on the open authentication information.

In some embodiments, wherein the open authentication information may include first open authentication information and second open authentication information, and the access control method may further comprise obtaining the first open authentication information when the distance between the door operating device and the user terminal is within the first distance.

In some embodiments, wherein the obtaining of the open authentication information may comprise obtaining the second open authentication information when the distance between the door operating device and the user terminal is within the second distance.

In some embodiments, wherein the second distance may be shorter than the first distance.

In some embodiments, wherein the establishing of the communication connection may comprise obtaining connection authentication information from the user terminal when the door operating device requests the connection authentication information; and establishing the communication connection between the door operating device and the user terminal based on the connection authentication information.

In some embodiments, wherein the communication connection between the door operating device and the user terminal may include at least one of Bluetooth communication connection, Wi-Fi communication connection, and BLE communication connection.

In some embodiments, wherein the obtaining of the second open authentication information may comprise requesting the second open authentication information to the user terminal and obtaining the second open authentication information in response to the request.

In some embodiments, wherein the open authentication information may include at least one of authentication information, user identification information, user terminal identification information, and a password.

In some embodiments, wherein the authentication information may include information on whether at least one of the user terminal and the user is authorized to open the door.

In some embodiments, the access control method may further comprise adjusting a reference received signal strength used for determining the second distance based on a maximum value of the received signal strength corresponding to the transmitted signal when the transmitted signal includes the open authentication information.

In some embodiments, wherein the adjusting of the reference received signal strength may comprise setting a received signal strength differed from the maximum value of the received signal strength by a predetermined value as the reference received signal strength.

According to an another aspect of the present disclosure, there is provided an access control method of a user terminal that communicates with a door operating device, the access control method may comprise determining a distance between the door operating device and the user terminal based on a received signal strength corresponding to a transmitted signal from the door operating device; determining whether the distance between the door operating device and the user terminal is within a first distance; establishing a communication connection between the door operating device and the user terminal when the distance between the door operating device and the user terminal is within the first distance; transmitting first open authentication information to the door operating device; determining whether the distance between the door operating device and the user terminal is within a second distance; and transmitting second open authentication information to the door operating device for requesting opening of a door when the distance between the door operating device and the user terminal is within the second distance.

In some embodiments, wherein the determining of whether the distance between the door operating device and the user terminal is within the second distance may comprise storing at least one received signal strength corresponding to the transmitted signal from the door operating device; and adjusting a reference received signal strength used for determining the second distance based on a maximum received signal strength of the stored at least one received signal strength.

In some embodiments, wherein the determining of whether the distance between the door operating device and the user terminal is within the second distance may comprise setting a received signal strength in a predetermined range based on the maximum received signal strength as the reference received signal strength.

According to an another aspect of the present disclosure, there is provided a door operating device configured to communicate with a user terminal, the door operating device may comprise a communication unit; and a control unit configured to determine a distance from the user terminal based on a strength of a signal transmitted from the user terminal, establish a communication connection with the user terminal and acquire the first open information through the communication connection using the communication unit from the user terminal when the distance from the user terminal is within a first distance, acquire second open authentication information from the user terminal using the communication unit when the distance between the user terminals is changed from the first distance to a second distance, and determine whether the door is open or not based on the first open authentication information and second open authentication information.

FIG. 1 is an environment diagram illustrating an access control system 10000 according to an exemplary embodiment.

Referring to FIG. 1, the access control system 10000 according to the embodiment may include a door operating device 1000, a user terminal 2000, and an authentication server 3000.

According to an embodiment, the door operating device 1000 may be connected to the user terminal 2000.

According to an embodiment, the door operating device 1000 may obtain open authentication information from the user terminal 2000 and may determine validity based on the obtained open authentication information. Further, the door operating device 1000 may determine whether to open the door based on a result of the validity determination.

According to an embodiment, the user terminal 2000 may be connected to the door operating device 1000.

The user terminal 2000 may establish a communication connection with the door operating device 1000 by transmitting connection authentication information to the door operating device.

In addition, the user terminal 2000 may request to open the door by transmitting the open authentication information to the door operating device 1000.

Alternatively, the user terminal 2000 may transmit the open authentication information to the door operating device 1000 such that the validity is determined, and may request to open the door by transmitting opening request information.

The authentication server 3000 may be connected to the user terminal 2000.

The authentication server 3000 may provide the open authentication information which the user terminal 2000 transmits to the door operating device 1000 to request to open the door.

The authentication server 3000 may be requested by the user terminal 2000 to issue the open authentication information.

In addition, when the authentication server 3000 is requested by the user terminal 2000 to issue the open authentication information, the authentication server 3000 may obtain information necessary to determine whether the user and/or the terminal are a valid user and/or valid user terminal 2000. When the user and/or the terminal are a valid user and/or valid user terminal 2000 as a result of the determination, the authentication server 3000 may issue the open authentication information to the user terminal 2000.

Figure 2:
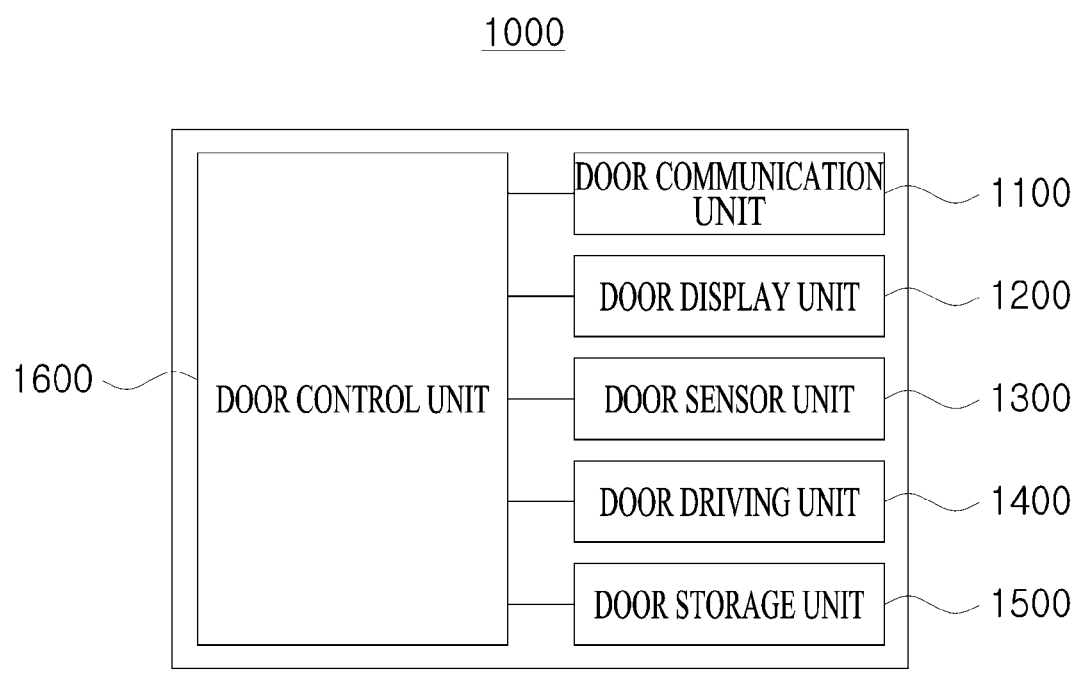
FIG. 2 is a block diagram illustrating a door operating device according to an exemplary embodiment.

FIG. 2 is a block diagram illustrating the door operating device 1000 according to an exemplary embodiment.

Referring to FIG. 2, the door operating device 1000 may include a door communication unit 1100, a door display unit 1200, a door sensor unit 1300, a door driving unit 1400, a door storage unit 1500, and a door control unit 1600.

The door communication unit 1100 may be a communication module capable of obtaining data from the user terminal 2000.

According to some embodiments of the present invention, the door communication unit 1100 may obtain data from the user terminal 2000 using a communication technique including Bluetooth, ZigBee, Bluetooth Low Energy (BLE), or RFID.

The door display unit 1200 may output visual information.

The door display unit 1200 may output information to be visually provided to the user. When the door display unit 1200 includes a touch panel, the door display unit 1200 may operate as a touch input-based input device.

The door sensor unit 1300 may obtain a signal for an open status of the door.

Alternatively, the door sensor unit 1300 may obtain a signal necessary to determine a status of the door.

The door driving unit 1400 may provide power necessary to lock or unlock the door body provided to the door. Further, when the door is implemented as an automatic door, the door driving unit 1400 may provide power necessary to open or close the door body.

The door storage unit 1500 may store a program for performing a control operation of the door control unit 1600 and may store data received from the outside and data generated by the door control unit 1600.

The door control unit 1600 controls the overall operation of the door operating device 1000.

Figure 3:
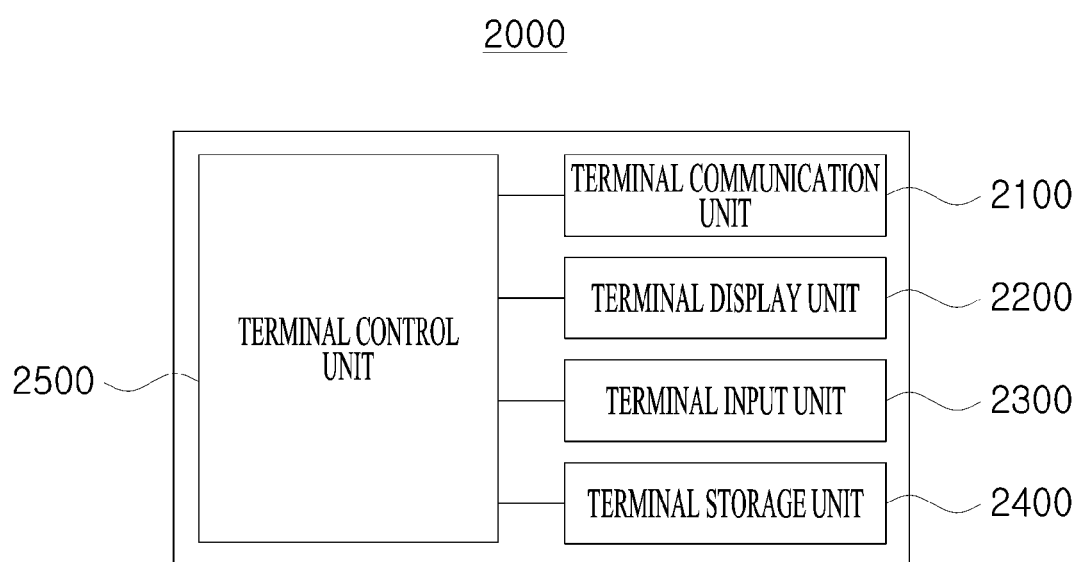
FIG. 3 is a block diagram illustrating a user terminal according to an exemplary embodiment.

FIG. 3 is a block diagram illustrating the user terminal 2000 according to an exemplary embodiment.

Referring to FIG. 3, the user terminal 2000 may include a terminal communication unit 2100, a terminal display unit 2200, a terminal input unit 2300, a terminal storage unit 2400, and a terminal control unit 2500.

The terminal communication unit 2100 may connect the user terminal 2000 to an external electronic device. For example, the terminal communication unit 2100 may connect the user terminal 2000 to external electronic devices such as the authentication server 3000 and the door operating device 1000. The terminal communication unit 2100 may be a communication module supporting wired and/or wireless communication.

The terminal display unit 2200 may output visual information.

When the terminal display unit 2200 is provided in the form of a touch screen, the terminal display unit 2200 may perform a function of the terminal input unit 2300. In this case, a separate terminal input unit 2300 may not be provided depending on the selection, and a terminal input unit 2300 to perform limited functions, such as volume control, power button, and home button, may be provided.

The terminal input unit 2300 may obtain a signal corresponding to a user input.

The terminal input unit 2300 may be implemented in the form of, for example, a keyboard, a keypad, a button, a jog shuttle, a wheel, or the like.

The user input may be, for example, pushing, touching, or dragging of a button.

When the terminal display unit 2200 is implemented in the form of a touch screen, the terminal display unit 2200 may serve as the terminal input unit 2300.

The terminal storage unit 2400 may store data.

The terminal storage unit 2400 may be implemented in the form of, for example, a flash memory, a random access memory (RAM), a read-only memory (ROM), a solid-state drive (SSD), a secure digital (SD) card, an optical disk, or the like.

The terminal storage unit 2400 may store data necessary for the operation of the user terminal 2000.

The terminal control unit 2500 may control the overall operation of the user terminal 2000.

Figure 4:
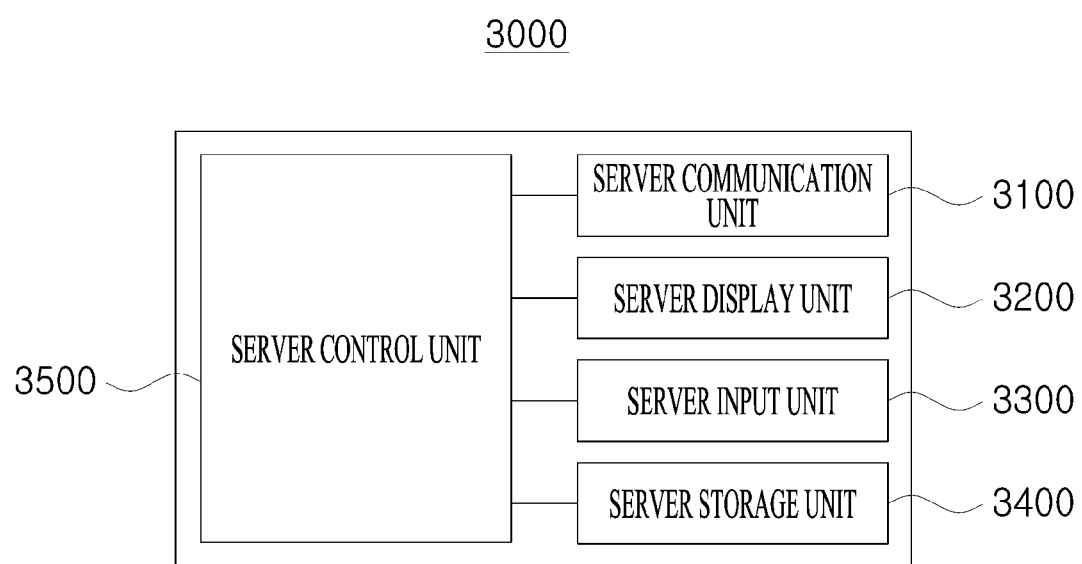
FIG. 4 is a block diagram illustrating an authentication server according to an exemplary embodiment.

FIG. 4 is a block diagram illustrating the authentication server 3000 according to an exemplary embodiment.

Referring to FIG. 4, the authentication server 3000 may include a server communication unit 3100, a server display unit 3200, a server input unit 3300, a server storage unit 3400, and a server control unit 3500.

The server communication unit 3100 may connect the authentication server 3000 to an external electronic device. That is, the server communication unit 3100 may transmit/receive data to/from an external electronic device. In addition, the server communication unit 3100 may maintain or release a communication connection with the user terminal 2000 as needed. The server communication unit 3100 may be provided to constantly maintain connection with the user terminal 2000 according to an embodiment.

The server communication unit 3100 may be a communication module supporting at least one of a wired communication scheme and a wireless communication scheme.

The server display unit 3200 may output visual information.

For example, the server display unit 3200 may be a liquid crystal display (LCD), an organic light-emitting diode (OLED) display, an active matrix OLED (AMOLED) display, or the like.

The server input unit 3300 may obtain an electrical signal corresponding to a user input. For example, the server input unit 3300 may include a keypad, a keyboard, a switch, a button, and a touch screen.

The server storage unit 3400 may store data.

For example, the server storage unit 3400 may store data obtained from the user terminal 2000. In another example, the server storage unit 3400 may store a program necessary for the operation of the authentication server 3000.

The server control unit 3500 may control the overall operation of the authentication server 3000.

The authentication server 3000 of the present invention does not necessarily include all the above-described elements, and may be provided with some elements excluded depending on the selection. For example, when the authentication server 3000 does not directly provide visual information, the authentication server 3000 may be provided without the server display unit 3200. The authentication server 3000 may be provided by adding an element for performing an additional function and operation depending on the selection.

Figure 5:
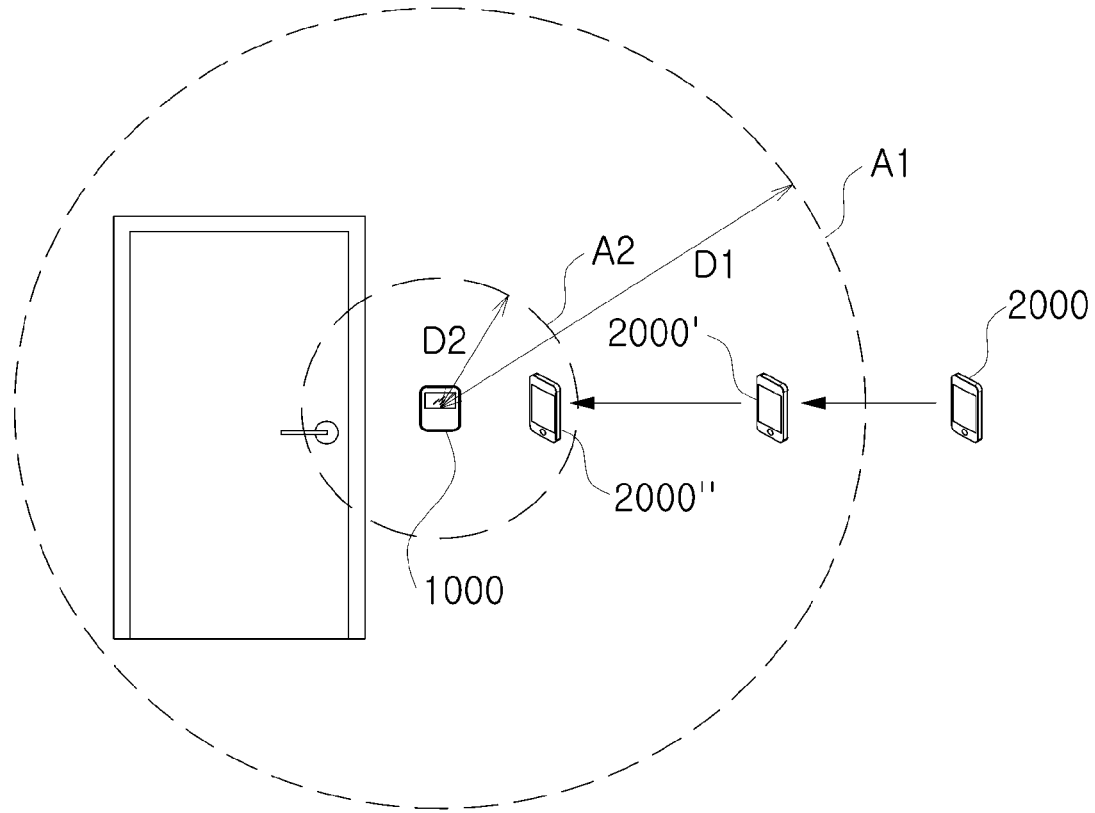
FIG. 5 is a schematic diagram illustrating a door operating environment according to an exemplary embodiment.

FIG. 5 is a schematic diagram illustrating a door operating environment according to an exemplary embodiment.

Referring to FIG. 5, the door operating environment according to the embodiment may provide a first area A1 within a first distance D1 from the door operating device 1000 and a second area A2 within a second distance D2 from the door operating device 1000.

According to an embodiment, the first distance D1 may be longer than the second distance D2.

According to an embodiment, the first area A1 and the second area A2 may overlap each other.

For example, the second area A2 may be at least a part of the first area A1.

Alternatively, according to an embodiment, the first area A1 and the second area A2 may be spaces separated from each other.

For example, the second area A2 within the second distance D2 from the door operating device 1000 may be provided, and the first area A1 within a predetermined distance from the second area A2 may be provided.

According to an embodiment, the user terminal 2000 may move in the first area A1 and the second area A2.

Hereinafter, a door operating method will be described with reference to FIGS. 6 to 8. For simplicity, it is assumed that the user terminal 2000 moves from the outside of the first area A1 into the first area A and the second area A2.

Figure 6:
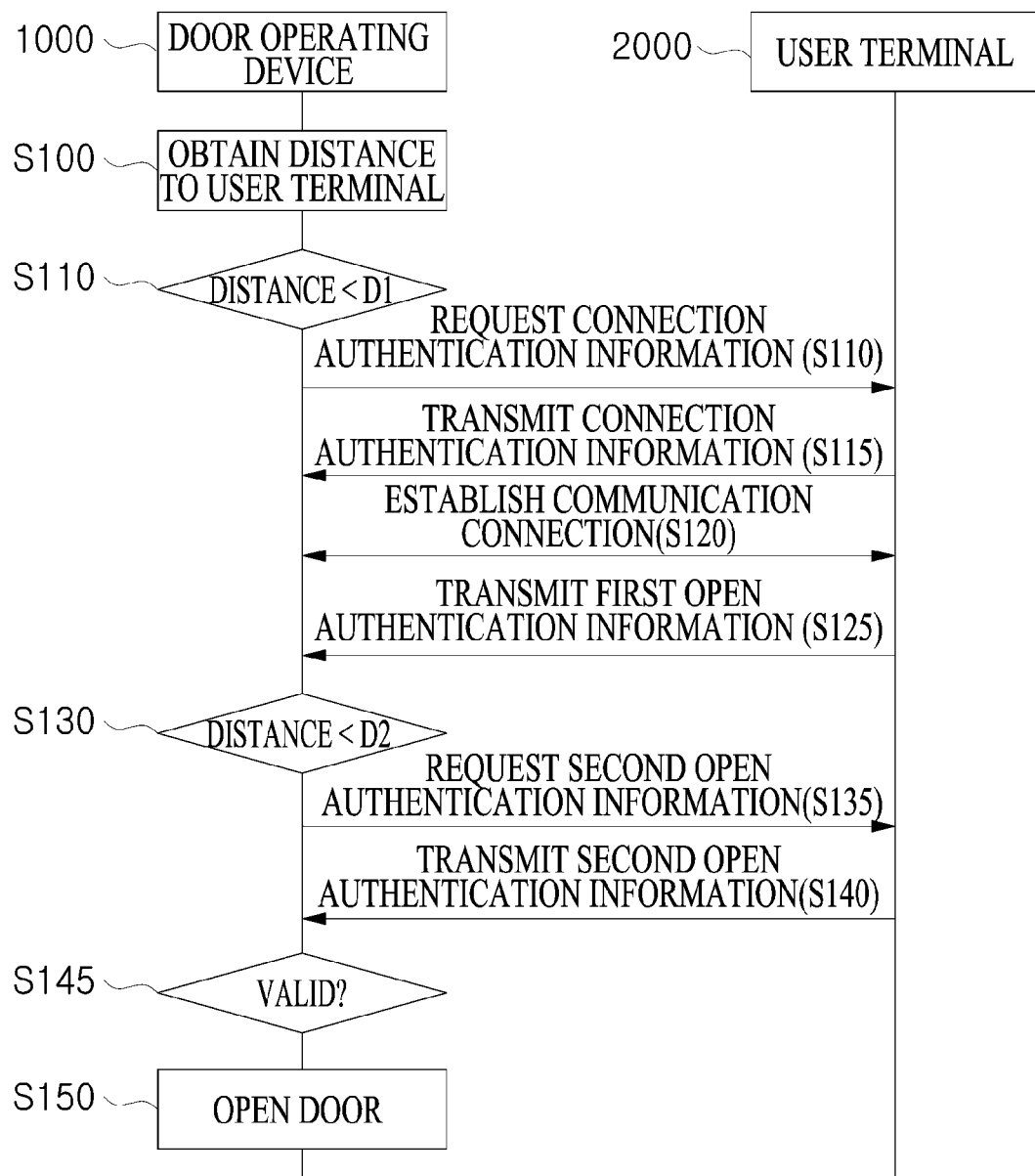
FIG. 6 is a flowchart illustrating a door operating method according to an exemplary embodiment.

FIG. 6 is a flowchart illustrating a door operating method according to an exemplary embodiment.

Referring to FIG. 6, the door operating method may include obtaining information about a distance to the user terminal 2000 (S100), determining whether the distance between the door operating device and the user terminal 2000 is within a first distance D1 (S105), requesting connection authentication information (S110), transmitting the connection authentication information (S115), establishing a communication connection (S120), transmitting first open authentication information (S125), determining whether the distance between the door operating device and the user terminal 2000 is within a second distance D2 (S130), requesting second open authentication information (S135), transmitting the second open authentication information (S140), determining validity (S145), and opening a door (S150).

According to an embodiment, obtaining the information about the distance to the user terminal 2000 may be performed (S100).

The door operating device 1000 may obtain the information about the distance between the door operating device 1000 and the user terminal 2000.

According to an embodiment, the door operating device 1000 may obtain the information about the distance between the door operating device 1000 and the user terminal 2000 based on a received signal strength indicator (RSSI).

For example, the door operating device 1000 may obtain the RSSI based on an advertise packet transmitted from the user terminal 2000. Further, the door operating device 1000 may obtain the information about the distance between the door operating device 1000 and the user terminal 2000 based on the obtained RSSI.

The door operating device 1000 may obtain a signal transmitted from the user terminal 2000 located within a communication range and may determine the RSSI of the obtained signal transmitted from the user terminal 2000.

The door operating device 1000 may also calculate the distance between the door operating device and the user terminal 2000 based on the RSSI of the signal transmitted from the user terminal 2000.

For example, when the RSSI of the signal transmitted from the user terminal 2000 is 10 dB, the door operating device 1000 may determine that the distance between the door operating device 1000 and the user terminal 2000 is 10 m.

The method of calculating the distance described above may be applied to obtaining information on the distance that is used to determine the first distance D1 and the second distance D2, which is described below.

For example, the obtaining of the information about the distance may be repeatedly performed according to a predetermined cycle, data transmission/reception, or the like. In addition, in order to obtain the distance information in determining the first distance D1 and the second distance D2, which will be described below, the obtaining of the information about the distance (S100) described above may be pre-performed.

Further, in obtaining the information about the distance described above, the RSSI may be obtained based on different data depending on the communication connection situation.

For example, prior to the communication connection between the door operating device 1000 and the user terminal 2000, the RSSI may be obtained by an advertise packet transmitted by one of the door operating device 1000 and the user terminal 2000, and the information about the distance may be obtained based on the obtained RSSI.

As another example, when the communication connection between the door operating device 1000 and the user terminal 2000 is maintained, the distance information may be obtained based on the strength of the signal received in data transmission and/or reception between the door operating device 1000 and the user terminal 2000.

According to an embodiment, determining whether the distance is within the first distance D1 may be performed (S105).

The door operating device 1000 according to the embodiment may determine whether the distance between the door operating device 1000 and the user terminal 2000 obtained based on the RSSI is within the first distance D1.

For example, when the first distance D1 is 15 m and the distance between the door operating device 1000 and the user terminal 2000 is 10 m, the door operating device 1000 may determine that the user terminal 2000 is located within the first distance D1.

According to an embodiment, requesting the connection authentication information may be performed (S110).

According to an embodiment, when the user terminal 2000 is located within the first distance D1, the door operating device 1000 may make a request for the connection authentication information to the user terminal 2000.

The connection authentication information may be information necessary for the door operating device 1000 and the user terminal 2000 to establish a communication connection.

For example, the connection authentication information may be information necessary for the communication connection, such as a communication ID, an encryption key, and a media access control (MAC) address.

According to an embodiment, transmitting the connection authentication information may be performed (S115).

According to an embodiment, the user terminal 2000 may transmit the connection authentication information to the door operating device 1000.

According to an embodiment, the user terminal 2000 may transmit the connection authentication information to the door operating device 1000 at the request for transmission of the connection authentication information from the door operating device 1000.

According to an embodiment, establishing the communication connection may be performed (S120).

According to an embodiment, the door operating device 1000 may establish the communication connection with the user terminal 2000.

For example, the communication connection may be established between the door communication unit 1100 of the door operating device 1000 and the terminal communication unit 2100 of the user terminal 2000.

According to an embodiment, the door communication unit 1100 of the door operating device 1000 and the terminal communication unit 2100 of the user terminal 2000 may be BLE communication modules, and the communication connection between the door operating device 1000 and the user terminal 2000 may be a BLE communication connection.

The door operating device 1000 may maintain communication with the user terminal 2000.

According to an embodiment, the door operating device 1000 may maintain the communication until the user terminal 2000 moves out of the first area A1.

According to an embodiment, transmitting the first open authentication information may be performed (S125).

The open authentication information may be information necessary to determine whether the user terminal 2000 and/or the user of the user terminal 2000 is a valid terminal and/or user authorized to open the door.

According to an embodiment, the open authentication information may include at least one of authentication information, user identification information, user terminal identification information, and a password.

The authentication information may be information about whether an authority to open the door is assigned.

The user identification information may be identification information assigned to the user.

The user terminal identification information may be identification information assigned to the user terminal 2000. For example, the user terminal identification information may include an ID, a model name, a serial number, and a communication number assigned to the user terminal.

The password may be information that may be used to determine validity based on matching. For example, the password may be a key including at least one of a number and a character. As another example, the password may be biometric information.

The open authentication information may include first open authentication information and second open authentication information.

The first open authentication information may be at least a part of the entire data packet of the open authentication information. In addition, the second open authentication information may be the remaining part of the data packet except for the first open authentication information.

According to an embodiment, the size of the data packet of the first open authentication information may be greater than that of the data packet of the second open authentication information.

In addition, the data packet included in the first open authentication information may be different from the data packet included in the second open authentication information.

Further, depending on the selection, a part of the data packet included in the first open authentication information may be identical to a part of the data packet included in the second open authentication information.

Therefore, the data packet included in the first open authentication information may be at least partially different from the data packet included in the second open authentication information.

While it has been described that the open authentication information includes the first open authentication information and the second open authentication information, the embodiments are not limited thereto. The first open authentication information and the second open authentication information may be subdivided. For example, the first open authentication information may be subdivided into 1-$1^{st}$ open authentication information and 1-$2^{nd}$ open authentication information, and the second open authentication information may be subdivided into 2-$1^{st}$ open authentication information and 2-$2^{nd}$ open authentication information.

Alternatively, the first open authentication information may be data obtained by encrypting the open authentication information, and the second open authentication information may be provided as an encryption key necessary to decode the first open authentication information and obtain the open authentication information.

According to an embodiment, the user terminal 2000 may transmit the first open authentication information to the door operating device 1000.

According to an embodiment, the user terminal 2000 may transmit the first open authentication information to the door operating device 1000 based on a first open authentication information request from the door operating device 1000.

According to an embodiment, the first open authentication information and the second open authentication information may be separately pre-stored in the user terminal 2000.

The user terminal 2000 may transmit, to the door operating device 1000, the first open authentication information between the first open authentication information and the second open authentication information which are separately pre-stored.

Alternatively, according to an embodiment, the first open authentication information and the second open authentication information may be integrated into open authentication information to be stored in the user terminal 2000.

The user terminal 2000 may obtain the first open authentication information by separating a predetermined data packet from the open authentication information, and may transmit the obtained first open authentication information to the door operating device 1000.

Alternatively, the user terminal 2000 may obtain the first open authentication information by separating a data packet of a predetermined size from the open authentication information, and may transmit the obtained first open authentication information to the door operating device 1000.

According to an embodiment, determining whether the distance is within the second distance D2 may be performed (S130).

According to an embodiment, the door operating device 1000 may determine the distance between the door operating device 1000 and the user terminal 2000 based on an RSSI at the time of obtaining a data packet from the user terminal 2000 with a communication connection established between the door operating device 1000 and the user terminal 2000.

The door operating device 1000 according to an embodiment may determine whether the distance between the door operating device 1000 and the user terminal 2000 obtained based on the RSSI is within the second distance D2.

For example, when the second distance D2 is 1 m and the distance between the door operating device 1000 and the user terminal 2000 is 30 cm, the door operating device 1000 may determine that the user terminal 2000 is located within the second distance D2.

According to an embodiment, requesting the second open authentication information may be performed (S135).

According to an embodiment, the door operating device 1000 may make a request for open authentication information to the user terminal 2000 when the user terminal 2000 is located within the second distance D2.

According to an embodiment, transmitting the second open authentication information may be performed (S140).

According to an embodiment, the user terminal 2000 may transmit the second open authentication information to the door operating device 1000.

According to an embodiment, the user terminal 2000 may transmit the second open authentication information to the door operating device 1000 at the request for transmission of the second open authentication information from the door operating device 1000.

According to an embodiment, determining the validity may be performed (S145).

According to an embodiment, the door operating device 1000 may obtain open authentication information based on the first open authentication information obtained at the first distance D1 between the door operating device 1000 and the user terminal 2000 and the second open authentication information obtained at the second distance D2 between the door operating device 1000 and the user terminal 2000.

According to an embodiment, the door operating device 1000 may obtain the open authentication information by integrating the first open authentication information and the second open authentication information.

According to an embodiment, the door operating device 1000 may obtain the open authentication information by decoding the first open authentication information with an encryption key included in the second open authentication information.

As described above, the user terminal 2000 may provide a portion of the open authentication information to the door operating device 1000 at the first distance D1 rather than sending the entire open authentication information at the first distance D1, and may provide the remaining portion of the open authentication information except for the first open authentication information at the distance D2. By transmitting a portion of the open authentication information before determining the validity, time required for data transmission may be reduced. Further, leak of the open authentication information may be prevented.

According to an embodiment, when the door operating device 1000 obtains the open authentication information from the user terminal 2000, it may determine whether the open authentication information is valid.

Determining whether the open authentication information is valid may include at least one of determining whether the open authentication information itself is valid, determining whether the user is valid based on the open authentication information, and determining whether the user terminal 2000 is valid based on the open authentication information.

According to an embodiment, determining the validity may be an operation of determining whether to open the door.

The door operating device 1000 may determine the validity based on the open authentication information.

The door operating device 1000 may determine the validity based on at least one of authentication information, user identification information, user terminal identification information, and a password included in the open authentication information.

According to an embodiment, the door operating device 1000 may determine that the open authentication information is valid when information indicating that the authority to open the door is assigned is included in the authentication information.

According to an embodiment, the door operating device 1000 may determine that the open authentication information is valid when the user identification information and/or the user terminal identification information match pre-registered user identification information and/or the user terminal identification information.

According to an embodiment, the door operating device 1000 may determine that the open authentication information is valid when it is determined that the password included in the open authentication information matches a pre-stored password.

Alternatively, according to an embodiment, the door operating device 1000 may determine the validity based on at least one of the user identification information, the user terminal identification information, and the password, and determine whether to open the door by determining whether the authority to open the door is assigned based on the authentication information.

For example, when the door operating device 1000 determines that the open authentication information is valid as a result of determination of the validity based on at least one of the user identification information, the user terminal identification information, and the password, the door operating device 1000 may determine whether to control door opening in further consideration of the authentication information included in the open authentication information. The door operating device 1000 may determine to open the door upon determining that the authentication information includes the authority to open the door.

According to an embodiment, opening the door may be performed (S150).

According to an embodiment, the door operating device 1000 may perform a control operation to open the door when the open authentication information is valid as an authentication result.

According to an embodiment, the door operating device 1000 may perform a control operation to open the door when the open authentication information is valid as the authentication result and the authority to open door is assigned.

When the open authentication information is valid as the authentication result, the door operating device 1000 may provide power through the door driving unit such that the door becomes unlocked.

Figure 7:
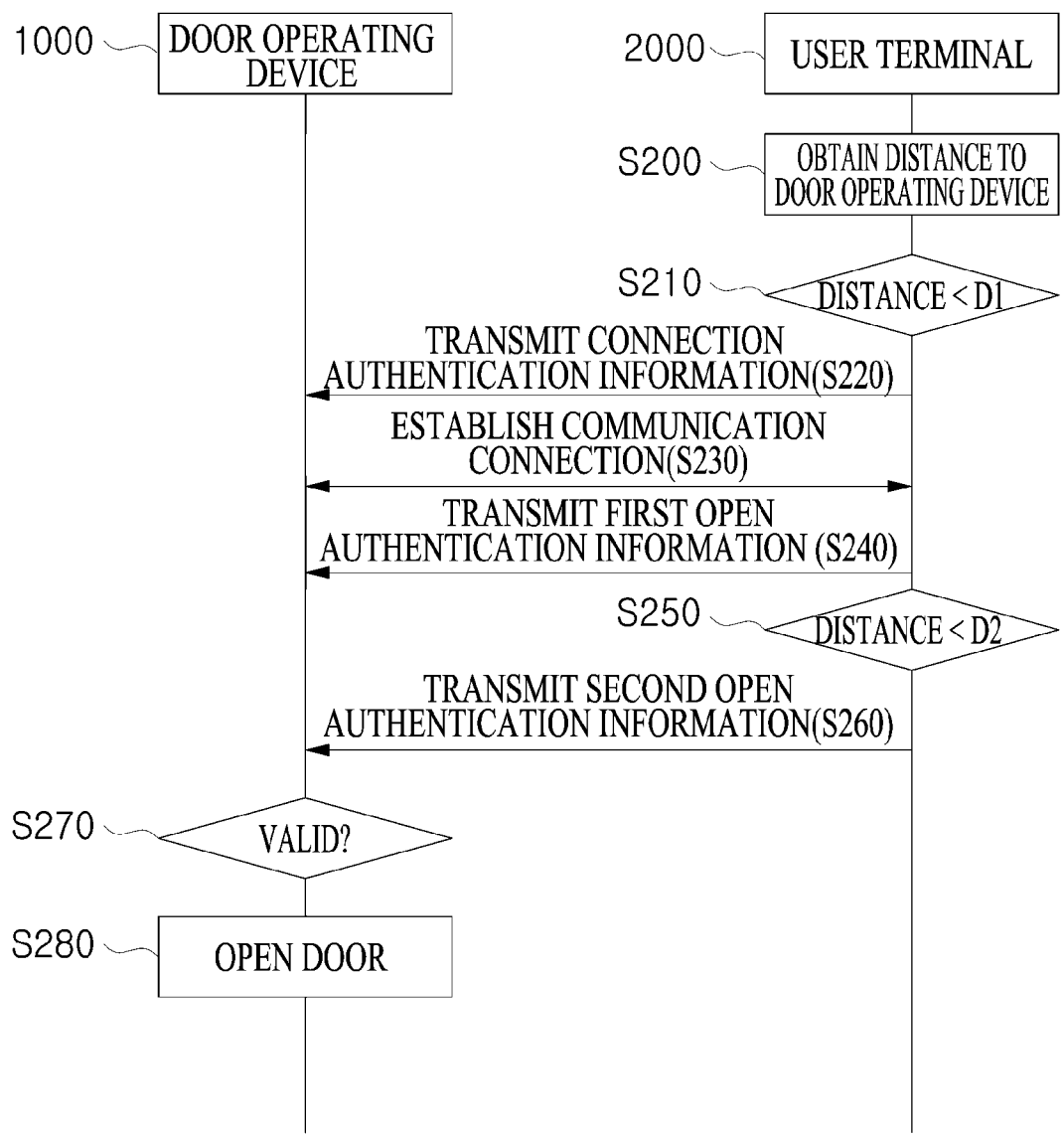
FIG. 7 is a flowchart illustrating a door operating method according to another exemplary embodiment.

FIG. 7 is a flowchart illustrating a door operating method according to another exemplary embodiment.

Referring to FIG. 7, the door operating method may include obtaining information about a distance to a door operating device (S200), determining whether the distance is within D1 (S210), transmitting connection authentication information (S220), establishing a communication connection (S230), transmitting first open authentication information (S240), determining whether the distance is within D2 (S250), transmitting second open authentication information (S260), determining validity (S270), and opening a door (S280).

According to an embodiment, obtaining information about the distance to the door operating device 1000 may be performed (S200).

According to an embodiment, the user terminal 2000 may obtain the information about the distance between the door operating device 1000 and the user terminal 2000.

According to an embodiment, the user terminal 2000 may obtain the information about the distance between the door operating device 1000 and the user terminal 2000 based on a received signal strength indication (RSSI).

For example, the user terminal 2000 may obtain the RSSI based on an advertise packet transmitted from the door operating device 1000. Further, the information about the distance between the door operating device 1000 and the user terminal 2000 may be obtained based on the obtained RSSI.

The user terminal 2000 may obtain a signal transmitted from the door operating device 1000 located within a communication range and may determine the RSSI of the obtained signal transmitted from the door operating device 1000.

Further, the user terminal 2000 may calculate the distance between the door operating device 1000 and the user terminal 2000 based on the RSSI of the signal transmitted from the door operating device 1000.

For example, when the RSSI of the signal transmitted from the door operating device 1000 is 10 dB, the user terminal 2000 may determine that the distance between the door operating device 1000 and the user terminal 2000 is 10 m.

According to an embodiment, determining whether the distance between the door operating device 1000 and the user terminal 2000 is within the first distance D1 may be performed (S210).

The user terminal 2000 according to the embodiment may determine whether the distance between the door operating device 1000 and the user terminal 2000 obtained based on the RSSI is within the first distance D1.

For example, when the first distance D1 is 15 m and the distance between the door operating device 1000 and the user terminal 2000 is 10 m, the user terminal 2000 may determine that the door operating device 1000 is located within the first distance D1.

According to an embodiment, transmitting the connection authentication information may be performed (S220).

According to an embodiment, the user terminal 2000 may transmit the connection authentication information to the door operating device 1000.

According to an embodiment, the user terminal 2000 may transmit the connection authentication information to the door operating device 1000 at the request for transmission of the connection authentication information from the door operating device 1000.

According to an embodiment, establishing the communication connection may be performed (S230).

According to an embodiment, the user terminal 2000 may establish the communication connection with the door operating device 1000.

For example, the communication connection may be established between the terminal communication unit 2100 of the user terminal 2000 and the door communication unit 1100 of the door operating device 1000.

According to an embodiment, the terminal communication unit 2100 of the user terminal 2000 and the door communication unit 1100 of the door operating device 1000 may be BLE communication modules, and the communication connection between the user terminal 2000 and the door operating device 1000 may be a BLE communication connection.

The user terminal 2000 may maintain communication with the door operating device 1000.

According to an embodiment, the user terminal 2000 may maintain the communication until the distance between the door operating device 1000 and the user terminal 2000 exceeds the first distance D1.

According to an embodiment, transmitting the first open authentication information may be performed (S240).

The open authentication information may be information necessary to determine whether the user terminal 2000 and/or the user of the user terminal 2000 is a valid terminal and/or user authorized to open the door.

According to an embodiment, the open authentication information may include at least one of authentication information, user identification information, user terminal identification information, and a password.

The authentication information may be information about whether an authority to open the door is assigned.

The user identification information may be identification information assigned to the user.

The user terminal identification information may be identification information assigned to the user terminal 2000. For example, the user terminal identification information may include an ID, a model name, a serial number, and a communication number assigned to the user terminal.

The password may be information that may be used to determine validity based on matching. For example, the password may be a key including at least one of a number and a character. As another example, the password may be biometric information.

The open authentication information may include first open authentication information and second open authentication information.

The first open authentication information may be at least a part of the entire data packet of the open authentication information. In addition, the second open authentication information may be the remaining part of the data packet except for the first open authentication information.

According to an embodiment, the size of the data packet of the first open authentication information may be greater than that of the data packet of the second open authentication information.

In addition, the data packet included in the first open authentication information may be different from the data packet included in the second open authentication information.

Further, depending on the selection, a part of the data packet included in the first open authentication information may be identical to a part of the data packet included in the second open authentication information.

Therefore, the data packet included in the first open authentication information may be at least partially different from the data packet included in the second open authentication information.

While it has been described that the open authentication information includes the first open authentication information and the second open authentication information, embodiments are not limited thereto. The first open authentication information and the second open authentication information may be subdivided. For example, the first open authentication information may be subdivided into 1-$1^{st}$ open authentication information and 1-$2^{nd}$ open authentication information, and the second open authentication information may be subdivided into 2-$1^{st}$ open authentication information and 2-$2^{nd}$ open authentication information.

Alternatively, the first open authentication information may be data obtained by encrypting the open authentication information, and the second open authentication information may be provided as an encryption key necessary to decode the first open authentication information and obtain the open authentication information.

According to an embodiment, the user terminal 2000 may transmit the first open authentication information to the door operating device 1000.

According to an embodiment, the user terminal 2000 may transmit the first open authentication information to the door operating device 1000 based on a first open authentication information request from the door operating device 1000.

According to an embodiment, the first open authentication information and the second open authentication information may be separately pre-stored in the user terminal 2000.

The user terminal 2000 may transmit, to the door operating device 1000, the first open authentication information between the first open authentication information and the second open authentication information which are separately pre-stored.

Alternatively, according to an embodiment, the first open authentication information and the second open authentication information may be integrated into open authentication information to be stored in the user terminal 2000.

The user terminal 2000 may obtain the first open authentication information by separating a predetermined data packet from the open authentication information, and may transmit the obtained first open authentication information to the door operating device 1000.

Alternatively, the user terminal 2000 may obtain the first open authentication information by separating a data packet of a predetermined size from the open authentication information, and may transmit the obtained first open authentication information to the door operating device 1000.

According to an embodiment, determining whether the distance to the door operating device 1000 is within the second distance D2 may be performed (S250).

According to an embodiment, the user terminal 2000 may determine the distance between the door operating device 1000 and the user terminal 2000 based on an RSSI at the time of obtaining a data packet from the door operating device 1000 with a communication connection established between the door operating device 1000 and the user terminal 2000.

The user terminal 2000 according to the embodiment may determine whether the distance between the door operating device 1000 and the user terminal 2000 obtained based on the RSSI is within the second distance D2.

For example, when the second distance D2 is 1 m and the distance between the door operating device 1000 and the user terminal 2000 is 30 cm, the user terminal 2000 may determine that the door operating device 1000 is located within the second distance D2.

According to an embodiment, transmitting the second open authentication information may be performed (S260).

According to an embodiment, the user terminal 2000 may transmit the second open authentication information to the door operating device 1000.

According to an embodiment, the user terminal 2000 may transmit the second open authentication information to the door operating device 1000 at the request for transmission of the second open authentication information from the door operating device 1000.

According to an embodiment, determining the validity may be performed (S270).

According to an embodiment, the door operating device 1000 may obtain open authentication information based on the first open authentication information obtained at the first distance D1 between the door operating device 1000 and the user terminal 2000 and the second open authentication information obtained at the second distance D2 between the door operating device 1000 and the user terminal 2000.

According to an embodiment, the door operating device 1000 may obtain the open authentication information by integrating the first open authentication information and the second open authentication information.

According to an embodiment, the door operating device 1000 may obtain the open authentication information by decoding the first open authentication information with an encryption key included in the second open authentication information.

According to an embodiment, when the door operating device 1000 obtains the open authentication information from the user terminal 2000, it may determine whether the open authentication information is valid.

Determining whether the open authentication information is valid may include determining whether the open authentication information itself is valid, determining whether the user is valid based on the open authentication information, and determining whether the user terminal 2000 is valid based on the open authentication information.

According to an embodiment, determining the validity may be an operation of determining whether to open the door.

The door operating device 1000 may determine the validity based on the open authentication information.

The door operating device 1000 may determine the validity based on at least one of authentication information, user identification information, user terminal identification information, and a password included in the open authentication information.

According to an embodiment, the door operating device 1000 may determine that the open authentication information is valid when information indicating that the authority to open the door is assigned is included in the authentication information.

According to an embodiment, the door operating device 1000 may determine that the open authentication information is valid when the user identification information and/or the user terminal identification information match pre-registered user identification information and/or the user terminal identification information.

According to an embodiment, the door operating device 1000 may determine that the open authentication information is valid when it is determined that the password included in the open authentication information matches a pre-stored password.

Alternatively, according to an embodiment, the door operating device 1000 may determine the validity based on at least one of the user identification information, the user terminal identification information, and the password, and determine whether to open the door by determining whether the authority to open the door is assigned based on the authentication information.

For example, when the open authentication information is valid as a result of determination of the validity based on at least one of the user identification information, the user terminal identification information, and the password, the door operating device 1000 may determine whether to control door opening in further consideration of the authentication information included in the open authentication information. The door operating device 1000 may determine to open the door upon determining that the authentication information includes the authority to open the door.

According to an embodiment, opening the door may be performed (S280).

According to an embodiment, the door operating device 1000 may perform a control operation to open the door when the open authentication information is valid as the authentication result.

According to an embodiment, the door operating device 1000 may perform a control operation to open the door when the open authentication information is valid as the authentication result and the authority to open door is assigned.

When the open authentication information is valid as the authentication result, the door operating device 1000 may provide power through the door driving unit such that the door becomes unlocked.

Figure 8:
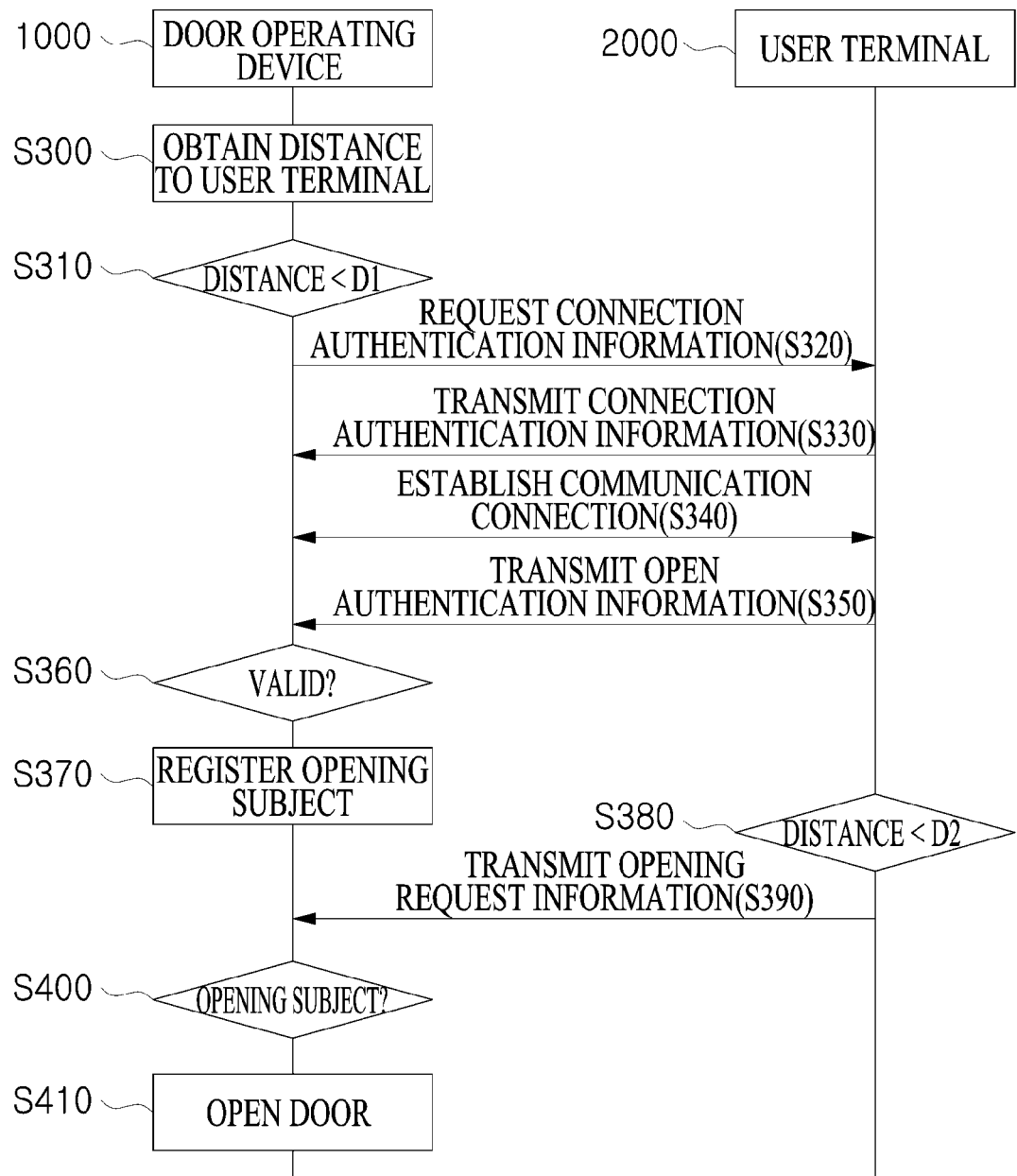
FIG. 8 is a flowchart illustrating a door operating method according to still another exemplary embodiment.

FIG. 8 is a flowchart illustrating a door operating method according to still another exemplary embodiment.

Referring to FIG. 8, the door operating method may include obtaining information about a distance to a user terminal 2000 (S300), determining whether the distance is within D1 (S310), requesting connection authentication information (S320), transmitting the connection authentication information (S330), establishing a communication connection (S340), transmitting open authentication information (S350), determining validity (S360), registering an opening subject (S370), determining whether the distance is within D2 (S380), transmitting opening request information (S390), determining whether the subject is an opening subject (S400), and opening a door (S410).

According to an embodiment, obtaining the information about the distance to the user terminal may be performed (S300).

The door operating device 1000 may obtain the information about the distance between the door operating device 1000 and the user terminal 2000.

According to an embodiment, the door operating device 1000 may obtain the information about the distance between the door operating device 1000 and the user terminal 2000 based on a received signal strength indicator (RSSI).

For example, the door operating device 1000 may obtain the RSSI based on an advertise packet transmitted from the user terminal 2000. Further, the door operating device 1000 may obtain the information about the distance between the door operating device 1000 and the user terminal 2000 based on the obtained RSSI.

The door operating device 1000 may obtain a signal transmitted from the user terminal 2000 located within a communication range and may determine the RSSI of the obtained signal transmitted from the user terminal 2000.

In addition, the door operating device 1000 may calculate the distance between the door operating device and the user terminal 2000 based on the RSSI of the signal transmitted from the user terminal 2000.

For example, when the RSSI of the signal transmitted from the user terminal 2000 is 10 dB, the door operating device 1000 may determine that the distance between the door operating device 1000 and the user terminal 2000 is 10 m.

According to an embodiment, determining whether the distance to the user terminal 2000 is within the first distance D1 may be performed (S310).

The door operating device 1000 according to the embodiment may determine whether the distance between the door operating device 1000 and the user terminal 2000 obtained based on the RSSI is within the first distance D1.

For example, when the first distance D1 is 15 m and the distance between the door operating device 1000 and the user terminal 2000 is 10 m, the door operating device 1000 may determine that the user terminal 2000 is located within the first distance D1.

According to an embodiment, requesting the connection authentication information may be performed (S320).

According to an embodiment, when the user terminal 2000 is located within the first distance D1, the door operating device 1000 may make a request for the connection authentication information to the user terminal 2000.

The connection authentication information may be information necessary for the door operating device 1000 and the user terminal 2000 to establish a communication connection.

For example, the connection authentication information may be information necessary for the communication connection, such as a communication ID, an encryption key, and a MAC address.

According to an embodiment, transmitting the connection authentication information may be performed (S330).

According to an embodiment, the user terminal 2000 may transmit the connection authentication information to the door operating device 1000.

According to an embodiment, the user terminal 2000 may transmit the connection authentication information to the door operating device 1000 at the request for transmission of the connection authentication information from the door operating device 1000.

According to an embodiment, establishing the communication connection may be performed (S340).

According to an embodiment, the door operating device 1000 may establish the communication connection with the user terminal 2000.

For example, the communication connection may be established between the door communication unit 1100 of the door operating device 1000 and the terminal communication unit 2100 of the user terminal 2000.

According to an embodiment, the door communication unit 1100 of the door operating device 1000 and the terminal communication unit 2100 of the user terminal 2000 may be BLE communication modules, and the communication connection between the door operating device 1000 and the user terminal 2000 may be a BLE communication connection.

The door operating device 1000 may maintain communication with the user terminal 2000.

According to an embodiment, the door operating device 1000 may maintain the communication until the user terminal 2000 moves out of the first area A1.

According to an embodiment, transmitting the open authentication information may be performed (S350).

According to an embodiment, the user terminal 2000 may transmit the open authentication information to the door operating device 1000.

According to an embodiment, the user terminal 2000 may transmit the open authentication information to the door operating device 1000 at the request for transmission of the open authentication information from the door operating device 1000.

According to an embodiment, the user terminal 2000 may transmit the open authentication information to the door operating device 1000.

According to an embodiment, the user terminal 2000 may transmit the open authentication information to the door operating device 1000 when a communication connection is established between the door operating device 1000 and the user terminal 2000.

According to an embodiment, determining the validity may be performed (S360).

According to an embodiment, when the door operating device 1000 obtains the open authentication information from the user terminal 2000, it may determine whether the open authentication information is valid.

Determining whether the open authentication information is valid may include determining whether the open authentication information itself is valid, determining whether the user is valid based on the open authentication information, and determining whether the user terminal 2000 is valid based on the open authentication information.

According to an embodiment, determining the validity may be an operation of determining whether to open the door.

The door operating device 1000 may determine the validity based on the open authentication information.

The door operating device 1000 may determine the validity based on at least one of authentication information, user identification information, user terminal identification information, and a password included in the open authentication information.

According to an embodiment, the door operating device 1000 may determine that the open authentication information is valid when information indicating that the authority to open the door is assigned is included in the authentication information.

According to an embodiment, the door operating device 1000 may determine that the open authentication information is valid when the user identification information and/or the user terminal identification information match pre-registered user identification information and/or the user terminal identification information.

According to an embodiment, the door operating device 1000 may determine that the open authentication information is valid when it is determined that the password included in the open authentication information matches a pre-stored password.

According to an embodiment, registering an opening subject may be performed (S370).

According to an embodiment, when the open authentication information is valid as a result of the determination, the door operating device 1000 may register the opening subject.

For example, when the open authentication information is valid as a result of the determination, the door operating device 1000 may register at least one of the user identification information and the user terminal identification information included in the open authentication information as the opening subject.

As another example, when the open authentication information is valid as a result of the determination, the door operating device 1000 may set a state of the user identification information and/or the user terminal identification information included in the open authentication information as an opening subject in a predetermined access subject list.

According to an embodiment, determining whether the distance to the user terminal 2000 is within the second distance D2 may be performed (S380).

According to an embodiment, the door operating device 1000 may determine the distance between the door operating device 1000 and the user terminal 2000 based on an RSSI at the time of obtaining a data packet from the user terminal 2000 with a communication connection established between the door operating device 1000 and the user terminal 2000.

The door operating device 1000 according to the embodiment may determine whether the distance between the door operating device 1000 and the user terminal 2000 obtained based on the RSSI is within the second distance D2.

For example, when the second distance D2 is 1 m and the distance between the door operating device 1000 and the user terminal 2000 is 30 cm, the door operating device 1000 may determine that the user terminal 2000 is located within the second distance D2.

According to an embodiment, transmitting the opening request information may be performed (S390).

According to an embodiment, the user terminal 2000 may transmit the opening request information at the request from the door operating device 1000.

According to an embodiment, the user terminal 2000 may transmit the opening request information to the door operating device 1000 when the distance between the door operating device 1000 and the user terminal 2000 is within the second distance D2.

The opening request information may be information for requesting the door operating device 1000 to open the door.

According to an embodiment, determining whether the subject is an opening subject may be performed (S400).

The door operating device 1000 may determine whether the user terminal 2000 that has transmitted the opening request information and/or the user of the user terminal 2000 is an opening subject.

The door operating device 1000 may determine whether the user terminal 2000 that has transmitted the opening request information and/or the user of the user terminal 2000 are pre-included in the opening subject.

The door operating device 1000 determines whether the user terminal 2000 that has transmitted the opening request information and/or the user of the user terminal 2000 are registered as an opening subject according to operation S370 of registering the opening subject.

According to an embodiment, opening the door may be performed (S410).

When the user terminal and/or the user of the user terminal is the opening subject as a result of the determination, the door operating device 1000 may perform a control operation to open the door.

When the user terminal and/or the user of the user terminal is the opening subject as a result of the determination, the door operating device 1000 may provide power through the door driving unit such that the door becomes unlocked.

Figure 9:
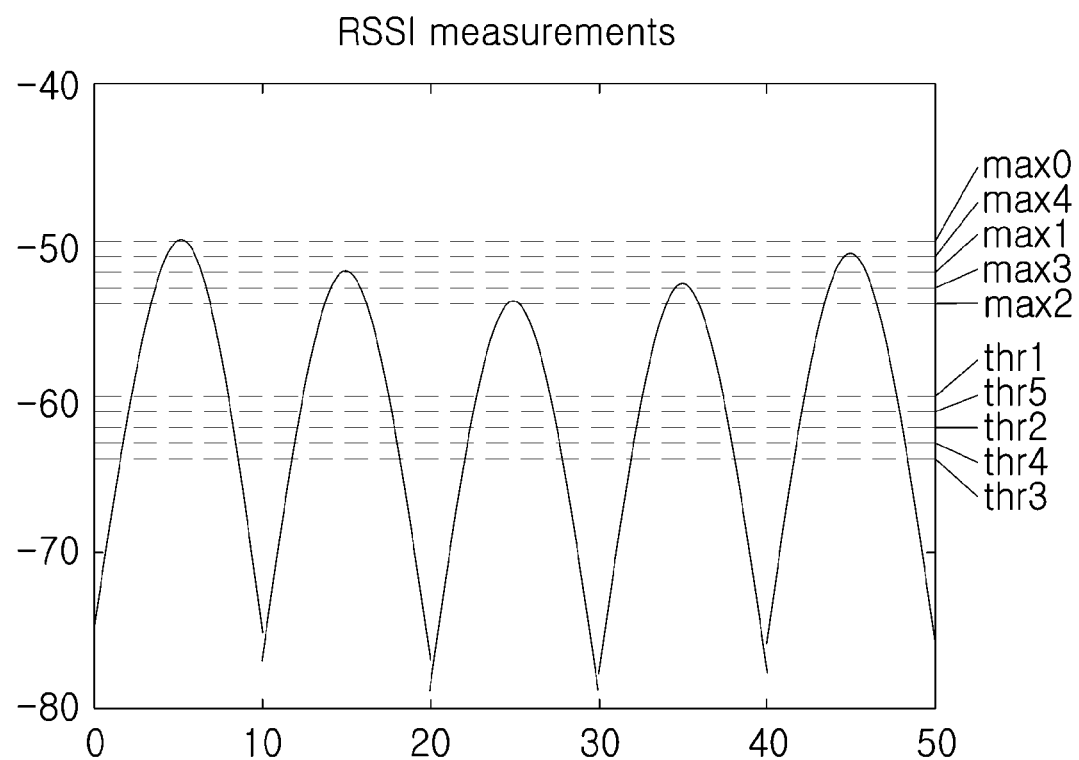
FIG. 9 is an exemplary diagram illustrating change of a variable area according to an exemplary embodiment of the present invention.

FIG. 9 is an exemplary diagram illustrating change of a variable area according to an exemplary embodiment of the present invention.

In the various embodiments described above, the first distance D1 and the second distance D2 may be variable.

In distance measurement using the RSSI, the distance may vary depending on the communication environment including humidity in the air even at the same signal strength given in a radio wave environment.

For example, when distance measurement is performed using the RSSI, 10 dB may be measured at a distance of 10 m in area A, whereas 8 dB may be measured at the distance of 10 m in area B depending on the environment.

Accordingly, different distances may be obtained at the same signal strength in reality depending on the communication environment.

Since the communication environment can be changed by various parameters, an error may occur in the distance measurement which is based on an initially set signal strength.

For example, when 10 dB is initially measured at a distance of 10 m and thus 10 dB is set as a reference for the first distance D1 to set the first distance D1 to 10 m, 8 m may be provided as the first distance D1 in reality depending on the environment.

To address this issue, a reference RSSI for determination of whether to establish a communication connection with the door operating device 1000 and/or the user terminal 2000 and an area where the open authentication information is transmitted may be changed.

The door operating device 1000 may store an RSSI at which the open authentication information and/or the opening request information according to some embodiments have been obtained within the initially set second distance D2.

According to an embodiment, the door operating device 1000 may obtain and store an RSSI at which the open authentication information request has been obtained from the user terminal 2000.

According to an embodiment, the door operating device 1000 may obtain and store the RSSI of a signal received from the user terminal 2000 at the time when the door operating device 1000 determined that the distance between the door operating device 1000 and the user terminal 2000 is within the second distance D2.

In addition, the door operating device 1000 may obtain the maximum RSSI among the stored RSSIs.

The door operating device 1000 may change the reference for the second area A2 based on the maximum RSSI.

According to an embodiment, the door operating device may set an RSSI which differs from the maximum RSSI by a value of a predetermined signal strength, as the reference for the second area A2.

Referring to FIG. 9, when a first maximum RSSI max0 obtained at a first time is −50 dB, the door operating device 1000 may set the reference for the second area A2 to a first RSSI thr1. When a second maximum RSSI maxi obtained at a second time is −52 dB, the door operating device 1000 may set the reference for the second area A2 to a second RSSI thr2.

While it has been described that the door operating device 1000 stores the open authentication information and/or the RSSI at which the open authentication information has been obtained, obtains the maximum RSSI among the stored RSSIs, and changes the reference for the second area A2 based on the obtained maximum RSSI, embodiments are not limited thereto. In an embodiment, the user terminal 2000 may change the reference for the second area A2.

According to an embodiment, the user terminal 2000 may store the RSSI at which the open authentication information according to some embodiments is obtained within the initially set second distance D2.

According to an embodiment, the user terminal 2000 may store the RSSI of a signal obtained from the door operating device 1000 at the time when it was determined that the distance between the door operating device 1000 and the user terminal 2000 is within the second distance D2.

The user terminal 2000 may store the RSSI at which the open authentication information request according to some embodiments is obtained within the initially set second distance D2.

In addition, the user terminal 2000 may obtain the maximum RSSI among the stored RSSIs.

The user terminal 2000 may change the reference for the second area A2 based on the maximum RSSI.

As described above, according to the present invention, inconvenience caused to a user due to a time required to open a door when a request is made by the user may be addressed by establishing a communication connection at a predetermined distance and obtaining information necessary to open the door at a closer distance.

While the present invention has been described with reference to the exemplary embodiments, it is to be understood that the invention is not limited to the disclosed exemplary embodiments. It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An access control method of a user terminal that communicates with a door operating device controls whether a door is to open or not, the access control method comprising:
   receiving a first signal from the door operating device;
   determining whether the distance between the door operating device and the user terminal is within a first distance based on the first signal; and
   transmitting a first information to the door operating device when it is determined the distance between the door operating device and the user terminal is within the first distance such that the door operating device determines whether the door is to open or not based on the first information;
   wherein the first information includes at least one of identification information of the user terminal and identification information of a user of the user terminal such that the door operating device determines whether the door is to open or not based on the at least one of the identification information of the user terminal and the identification information of the user of the user terminal included in the first information.

2. The access control method of claim 1, further comprising:
   establishing a communication connection between the door operating device and the user terminal when the distance between the door operating device and the user terminal is within the first distance.

3. The access control method of claim 1, further comprising:
   establishing a communication connection between the door operating device and the user terminal when the user terminal receives the first signal.

4. The access control method of claim 1, wherein the first signal includes the identification information of the door operating device.

5. The access control method of claim 4, wherein the user terminal determines whether to transmit the first information to the door operating device based on the identification information of the door operating device.

6. The access control method of claim 3, wherein the user terminal transmits encryption information to the door operation device such that the door operating device decrypts the first information based on the encryption information.

7. The access control method of claim 5, wherein the user terminal does not transmit the first information to the door operating device when it is determined not to transmit the first information to the door operating device.

8. The access control method of claim 1, wherein the determining whether the distance between the door operating device and the user terminal is within the first distance comprises:
   storing at least one received signal strength corresponding to the first signal from the door operating device; and adjusting a reference received signal strength used for determining the first distance based on a maximum received signal strength of the stored the at least one received signal strength.

9. The access control method of claim 8, wherein the determining whether the distance between the door operating device and the user terminal is within the first distance comprises:
setting a received signal strength in a predetermined range based on the maximum received signal strength as the reference received signal strength.

10. An access control method of a door operating device that communicates with a user terminal and controls whether a door is to open or not, the access control method comprising:
transmitting a first signal;
receiving a first information from the user terminal when the distance between the door operating device and the user terminal is within a first distance; and
wherein the first information includes at least one of identification information of the user terminal and identification information of a user of the user terminal,
determining whether the door is to open or not based on the at least one of the identification information of the user terminal and the identification information of the user of the user terminal included in the first information.

11. The access control method of claim 10, further comprising:
establishing a communication connection between the door operating device and the user terminal when the distance between the door operating device and the user terminal is within the first distance.

12. The access control method of claim 10, further comprising:
establishing a communication connection between the door operating device and the user terminal when the user terminal receives the first signal.

13. The access control method of claim 10, wherein the first signal includes the identification information of the door operating device such that the user terminal determines whether the user terminal transmits the first signal to the door operating device based on the identification information of the door operating device.

14. The access control method of claim 12, wherein the door operating device receives encryption information from the user terminal and wherein the door operating device decrypts the first information based on the encryption information.

15. The access control method of claim 1, wherein the door operating device does not receive the first information from the user terminal when the user terminal determined to transmit the first information to the door operating device.

16. The access control method of claim 11, wherein the establishing of the communication connection comprises:
obtaining connection authentication information from the user terminal when the door operating device requests connection authentication information; and
establishing the communication connection between the door operating device and the user terminal based on the connection authentication information.

17. The access control method of claim 11, wherein the communication connection between the door operating device and the user terminal is at least one of Bluetooth communication connection, Wi-Fi communication connection, and BLE communication connection.

18. The access control method of claim 10, wherein the first information includes information on whether at least one of the user terminal and the user is authorized to open the door.

19. A non-transitory computer readable recording medium having a program recorded thereon for executing the method of claim 1.

20. A non-transitory computer readable recording medium having a program recorded thereon for executing the method of claim 10.

* * * * *